United States Patent
Meyers

(10) Patent No.: US 11,910,497 B2
(45) Date of Patent: Feb. 20, 2024

(54) METHOD AND ARRANGEMENT FOR DE-ICING A TRANSPARENT WINDOW USING AN ELECTRIC HEATING DEVICE

(71) Applicant: AGC GLASS EUROPE, Louvain-la-Neuve (BE)

(72) Inventor: Michel Meyers, La Hulpe (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 807 days.

(21) Appl. No.: 16/964,523

(22) PCT Filed: Jan. 24, 2019

(86) PCT No.: PCT/EP2019/051789
§ 371 (c)(1),
(2) Date: Jul. 23, 2020

(87) PCT Pub. No.: WO2019/145444
PCT Pub. Date: Aug. 1, 2019

(65) Prior Publication Data
US 2021/0037616 A1 Feb. 4, 2021

(30) Foreign Application Priority Data

Jan. 26, 2018 (EP) ..................................... 18153652

(51) Int. Cl.
| | |
|---|---|
| *H05B 3/84* | (2006.01) |
| *B60J 1/00* | (2006.01) |
| *B60J 1/02* | (2006.01) |
| *B60R 16/00* | (2006.01) |
| *H05B 1/02* | (2006.01) |

(52) U.S. Cl.
CPC ................ *H05B 3/84* (2013.01); *B60J 1/002* (2013.01); *B60J 1/02* (2013.01); *B60R 16/005* (2013.01); *H05B 1/0202* (2013.01); *H05B 1/0236* (2013.01)

(58) Field of Classification Search
CPC ........ H05B 3/84; H05B 3/845; H05B 3/0042; H05B 3/86; H05B 1/0202; H05B 1/0236; H05B 2203/031; H05B 2214/02; B60J 1/002; B60J 1/02; B60R 16/005
See application file for complete search history.

(56) References Cited

U.S. PATENT DOCUMENTS

| | | | |
|---|---|---|---|
| 2012/0234816 A1* | 9/2012 | Petrenko | H05B 1/0236 219/203 |
| 2013/0082043 A1* | 4/2013 | McCarthy | H05B 3/84 219/203 |
| 2017/0034875 A1 | 2/2017 | Weber et al. | |
| 2022/0272798 A1* | 8/2022 | Seo | H01Q 1/1278 |

FOREIGN PATENT DOCUMENTS

| | | | |
|---|---|---|---|
| DE | 10 2016 200 931 A1 | 7/2017 | |
| DE | 102016200931 A1 * | 7/2017 | |
| JP | 2021513184 A * | 5/2021 | |
| RU | 2656937 C1 * | 6/2018 | B64C 1/14 |
| WO | WO 2015/162108 A1 | 10/2015 | |
| WO | WO-2021067567 A1 * | 4/2021 | B64C 1/1484 |

OTHER PUBLICATIONS

International Search Report dated Mar. 25, 2019 in PCT/EP2019/051789 filed Jan. 24, 2019

* cited by examiner

*Primary Examiner* — Shawntina T Fuqua
(74) *Attorney, Agent, or Firm* — Oblon, McClelland, Maier & Neustadt, L.L.P.

(57) ABSTRACT

A method to retrofit a transparent window which does not comprise an electric heating device, such as a vehicle windshield, with a transparent window having an electric heating device. The method includes (i) removing from the vehicle the transparent window which does not comprise an electric heating device, (ii) installing a transparent window, provided with an electric heating device, such as a heating layer, and at least one temperature sensor, to obtain a retrofitted heating transparent window, (iii) connecting the electric heating device to a voltage supply device such that by applying a heating voltage to the transparent window, and (iv) connecting a remote control device with the at least one temperature sensor and the voltage supply device.

17 Claims, No Drawings

METHOD AND ARRANGEMENT FOR DE-ICING A TRANSPARENT WINDOW USING AN ELECTRIC HEATING DEVICE

The invention is in the area of motor vehicle technology and relates to a method and an arrangement for de-icing and/or de-fogging a transparent window with an electric heating device.

More particularly, the invention concerns a method to retrofit a non-heatable transparent window mounted on a vehicle by a heatable transparent window. With a heatable transparent window, the de-icing and/or de-fogging functionality is thus available with an electric heating device provided on the new transparent window.

Transparent windows with an electric heating layer are well known per se and have already been described many times in the patent literature. In motor vehicles, they are often used as windshields since, by law, the central visual field must have no substantial vision restrictions. By means of the heat generated by the heating layer, condensed moisture, ice, and snow can be removed within a short time.

The heating current is usually introduced into the heating layer via at least one pair of strip-shaped electrodes ("bus bars"), which, as collecting conductors, distribute the heating current over a wide front. Generally, in order to nevertheless obtain adequate heating power for practical application, the heating voltage must be very high, whereas in internal combustion engine driven motor vehicles, the currently standard available onboard voltage is from 12 to 48 volts.

The European Patent application EP 0256 690 presents a method for the electrical heating of a window with different feed voltages, with a higher feed voltage used for de-icing and a lower feed voltage used for defogging. The window heater is turned off at a critical window temperature.

The German Patent application DE 10313464 A1 teaches a method for window heating, wherein the electrical energy supplied to a rear window heater is adjusted as a function of the window temperature. Upon reaching a threshold value for the rear window temperature, the window heater is turned off.

In contrast, the object of the present invention consists in a simple method to retrofit an existing non-heatable transparent window originally installed on a vehicle by a new heatable transparent window. Also, the invention proposes a method for de-icing and/or de-fogging transparent windows using an electric heating device. This and other objects are accomplished according to the proposal of the invention by means of a method and an arrangement with the characteristics of the coordinated claims. Advantageous embodiments of the invention are indicated by the characteristics of the subclaims.

According to the invention, an arrangement for de-icing and/or defogging a transparent window and a method to retrofit a transparent window which does not comprise an electric heating device, in particular a vehicle windshield, with a transparent window having an electric heating device, are presented.

According to the invention, the method to retrofit a transparent window which does not comprise an electric heating device, in particular a vehicle windshield, with a transparent window having an electric heating device, in particular a heating layer, comprises the following steps:
a. remove from the vehicle the transparent window which does not comprise an electric heating device, in particular a vehicle's windshield
b. install a transparent window, provided with an electric heating device, in particular a heating layer, and at least one temperature sensor to obtain a retrofitted heating transparent window,
c. connect the electric heating device to a voltage supply device such that by applying a heating voltage to the transparent window and,
d. connect a remote control device with the at least one temperature sensor and the voltage supply device.

The window arrangement according to the invention comprises a transparent window with an electric heating device, which can be designed in a variety of ways, for example, in the form of thin heating wires, which serve as linear heating elements. Preferably, but not mandatorily, the electric heating device is a transparent electric heating layer or foil, which extends over a substantial part of the window area, in particular over its central visual field. The heating device can be or is electrically connected via electrical connection means to a voltage supply device for providing a feed voltage or a heating voltage. In the case of an electric heating layer, the connection means comprise at least two connection electrodes, which serve to introduce the heating current into the heating layer and are electrically connected to the heating layer such that after application of the feed voltage, a heating current flows over a heating field formed by the heating layer. The connection electrodes can be implemented, for example, in the form of strip or band electrodes, to introduce the heating current, as bus bars, widely distributed into the heating layer. Compared to the high-impedance heating layer, the connection electrodes have a relatively low or low-impedance electrical resistance.

The arrangement also includes at least one temperature sensor, which is disposed and implemented such that it can measure the temperature of the transparent window, as well as an electronic control device coupled to the at least one temperature sensor and the voltage supply device, which is suitably configured to carry out the method according to the invention. A control or regulating loop for the heating of the window is formed by the control device, the voltage supply device, and the at least one temperature sensor.

The temperature sensors are advantageously disposed in the edge region of the window, in particular distributed over the edge region of the window or over the bus bars region, since, usually, greater temperature-induced stresses occur there, such that the window breakage risk is increased. The sensor may be implemented in the form of an electronic sensor that can be implemented on the internal face of the window or if the thickness is suitable, implemented in the laminated window in case of windshield. However, the at least one temperature sensor may be implemented in the form of printed conductor or measuring loops, which are produced, in particular, using a printing technique, for example, from the same material as the bus bars.

The method according to the invention is carried out on the basis of a manually or automatically activated de-icing process, with the de-icing process activated, for example, by a start signal. The start signal can be generated manually by an operator, for example, by pressing on a switch element implemented for example on internal face or inside the window (in case of laminated window) of the retrofitted window, or automatically, for example, after starting an independent voltage supply device dedicated to the retrofitted window when certain conditions are present, such as low external temperatures below 0° C. of for example by using an application from a smartphone or any suitable mean when the driver wishes to heat the window (via Bluetooth, WiFi or LTE connection). It is understood that the method according to the invention can include a step for starting the de-icing process, in particular by generating a start signal. In the following, there is a description of the process steps carried out for de-icing and/or de-fogging the window with an already started de-icing process.

The method according to the invention includes a process step, in which the window temperature is measured before the initial application of a heating voltage to the heating device. Here, the de-icing or de-fogging process is terminated before application of a heating voltage if the window temperature measured is above a selectable lower temperature threshold value. The arrangement then automatically transitions into a standby or OFF state. Alternatively, for the case that the window temperature measured in is equal to or less than the lower temperature threshold value, a heating voltage of a selectable size is applied to the heating device for heating or de-icing the window for a heating period of a selectable duration or for a period needed to reach/recover the temperature threshold.

The window temperature is measured at the before starting heating the window. The de-icing process is terminated if the window temperature reaches a selectable upper temperature threshold value. The arrangement then transitions automatically into the standby or OFF state. for the case that the window temperature is lower than the upper temperature threshold value, the de-icing process is continued.

In the method according to the invention, the heating voltage is comprised between 30 and 60 volts to the heating device to apply a heating power corresponding to a resistance less than 10 ohms ($\Omega$) per square meter ($m^2$) of window area is generated. For example, in motor vehicle windshields, de-icing and/or de-fogging may be achieved reliably and safely with particularly low voltage applied for heating the window without risk of damaging the window. With a view to reduce damages of window, the heating voltage and the heating period are selected such that a heating power corresponding to a resistance less than 10 ohms ($\Omega$) per square meter ($m^2$) of window area is generated.

In a particular embodiment, the heating voltage comprised between 30 and 60 volts is achieved progressively. For example, a first pulse of 15V is done and progressively increased (for example every minutes) to achieved a final voltage comprised between 30 and 60 volts. Thus, hot spots or aggressive heating is limited even avoided.

By means of the method according to the invention, efficient de-icing and/or de-fogging of a transparent window can be obtained, while simultaneously reliably and safely avoiding heating of the window above the selectable upper temperature threshold value. Depending on the selection of the upper temperature threshold value, this advantageously enables preventing breaking of the window or of connection elements, such as solder and adhesive connections due to large temperature changes. Thermally induced damage of the window through the de-icing and/or de-fogging process can thus be prevented. On the other hand, with a correspondingly low upper temperature threshold value, it is possible for a person to avoid being burned if the heated window is deliberately or inadvertently touched.

In the method according to the invention, if more than one heating period are applied, the heating periods may be the same length or have a duration different from one another.

In another advantageous embodiment of the method according to the invention, the size of the heating voltage is selected as a function of the window temperature measured by the temperature sensor, with a lower heating voltage selected in the case of a higher window temperature and a higher heating voltage selected in the case of a lower window temperature. This measure advantageously enables adaptation of the heating voltage to the external ambient temperature such that the heating power can be selectively adjusted and the electrical energy consumed for de-icing and/or de-fogging can be reduced.

In the method according to the invention, it is advantageous in practical applications for temperature less or equal to 4° C., and more particularly for temperature below than 0° C., to be selected as the lower temperature threshold value such that a de-icing process and/or de-fogging is carried out only when the external ambient temperature is below the dewpoint. In addition, it is advantageous if the upper temperature threshold value is in the range from 20° C. to 90° C., preferably in the range from 50° C. to 70° C., and is, for example, 70° C. As a result of this, on the one hand, rapid de-icing and/or de-fogging can be obtained with low electric power loss. On the other, breaking of the window during de-icing as well as burning of a body part upon touching the window is reliably and safely avoided.

The invention further extends to a window arrangement with a transparent window, in particular a motor vehicle windshield, with an electric heating device, in particular a heating layer, which is connected to at least two electrodes for connection to a voltage supply device such that by applying a heating voltage, a heating current flows through the heating device. It further includes at least one temperature sensor for measuring the window temperature, as well as a remote control device coupled with the at least one temperature sensor and the voltage supply device, which is suitably configured to carry out a method as described above.

In an advantageous embodiment of the window arrangement, the electrodes and the at least one temperature sensor, which can, for example, be made from the same material as the electrodes, may be printed onto the heating device implemented in the form of a heating layer using a printing technique. By means of this measure, the at least one temperature sensor can be produced in series production, in a particularly simple and economical manner. The at least one temperature sensor is, for example, implemented in the form of a conductor loop or measuring loop.

In another advantageous embodiment of the window arrangement, a plurality of temperature sensors are provided, which are distributedly disposed over the circumferential window edge or edge region of the window, preferably uniformly distributed, such that temperature changes in the particularly break-sensitive edge region of the window can be detected.

In another embodiment, at least temperature sensor is provided on the area of the obscuration band of the glazing in order to better measure the temperature. Thus, the real performances of the heating of the glazing in its whole can be optimally measured.

The invention further extends to the use of a window of the arrangement according to the invention as described above as a functional individual piece and as a built-in part in furniture, devices, and buildings, as well as in means of transportation for travel on land, in the air, or on water, in particular in motor vehicles, preferably in electric vehicles, in particular as a windshield, rear window, side window, and/or glass roof.

It is understood that the different embodiments can be realized individually or in any combinations. In particular, the aforementioned characteristics and those to be explained in the following can be used not only in the combinations indicated, but also in other combinations or alone, without departing from the scope of the present invention.

The invention is now explained in detail using exemplary embodiments

According to one embodiment of the present invention, the window arrangement includes a transparent windshield of a motor vehicle, preferably of an electric motor vehicle, which is implemented, for example, as a composite window.

According to one embodiment of the present invention, the windshield has a rigid outer pane and a rigid inner pane, which are both implemented as individual panes and are fixedly bonded to each other via a thermoplastic adhesive layer. The two individual panes are approximately the same size, have a roughly trapezoidal curved contour, with the understanding that the invention is not restricted to this, but rather that the windshield can have any other shape suited for the practical application. The two individual panes are made of a glass material, such as float glass, cast glass, or ceramic glass or a non-glass material, for example, plastic, in particular polystyrene (PS), polyamide (PA), polyester (PE), polyvinyl chloride (PVC), polycarbonate (PC), polymethyl methacrylate (PMA), or polyethylene terephthalate (PET). In general, any material with sufficient chemical resistance, suitable shape and size stability, as well as adequate optical transparency can be used. Plastic, in particular based on polyvinyl butyral (PVB), ethylene vinyl acetate (EVA), and polyurethane (PU), can, for example, be used as an adhesive layer for bonding the two individual panes. For an application other than as a windshield, it would also be possible to produce the two individual panes from a flexible material. This kind of windshield are well-known and commonly used today.

The contour of the windshield is defined by a circumferential window edge, which is composed corresponding to the trapezoidal shape of two long window edges (top and bottom in the installation position) and two short window edges (left and right in the installation position).

According to one embodiment, a transparent heating layer serving for electric heating of the windshield is deposited on the side of the inner pane 4 bonded to the adhesive layer ("side 3"). The heating layer is applied substantially on the entire surface of the inner pane, with an edge strip of the inner pane circumferential on all sides not coated such that a heating layer edge is set back inward relative to the window edge.

According to one preferred embodiment, the heating layer is not applied on the inner pane 4, but instead to apply it on a large-area carrier, which is subsequently adhered to the individual panes and laminated between the 2 panes of glass. Such a carrier can, in particular, be a plastic film, made for example of polyamide (PA), polyurethane (PU), polyvinyl chloride (PVC), polycarbonate (PC), polyester (PE), or polyvinyl butyral (PVB) . . . .

The heating layer includes an electrically conductive material. Examples of this are metals with high electrical conductivity such as silver, copper, gold, aluminum, or molybdenum, metal alloys such as silver alloyed with palladium, as well as transparent, conductive oxides (TCOs). TCOs are preferably indium tin oxide, fluoride-doped tin dioxide, aluminum-doped tin dioxide, gallium-doped tin dioxide, boron-doped tin dioxide, tin zinc oxide, or antimony-doped tin oxide. The heating layer 7 can consist of one conductive individual layer or a layer structure that includes at least one conductive sublayer. For example, such a layer structure includes at least one conductive sublayer, preferably silver (Ag), and other sublayers, such as anti-reflection and blocker layers.

The thickness of the heating layer can vary widely, with the thickness at every point being, for example, in the range from 30 nm to 100 µm. In the case of TCOs, the thickness is, for example, in the range from 100 nm to 1.5 µm, preferably in the range from 150 nm to 1 µm, and even more preferably in the range from 200 nm to 500 nm. Advantageously, the heating layer has high thermal stability such that it withstands the temperatures of typically more than 600° C. necessary for the bending of glass without functional degradation. However, even a heating layer with low thermal stability, which is applied after the bending of the glass pane, can be provided. The sheet resistance of the heating layer is preferably less than 20 ohm and is, for example, in the range from 0.1 to 20 ohm. In the exemplary embodiment depicted, the sheet resistance of the heating layer is, for example, in the range from 1 to 5 ohm.

The heating layer is, for example, deposited from the gas phase, for which purpose methods known per se, such as chemical vapor deposition (CVD) or physical vapor deposition (PVD), can be used. Preferably, the heating layer is deposited by sputtering (magnetron cathode sputtering).

In one particular embodiment, the heating layer may be, conductive wires embedded into the adhesive layer bonder the two panes to form a heated wired windshield.

The windshield must be adequately transparent to visible light in the wavelength range from 350 nm to 800 nm, with the term "transparency" understood to mean light transmittance of more than 80%. This can be obtained, in particular, by means of individual panes made of glass and a transparent heating layer 7 made of silver (Ag).

The heating layer 7 is electrically connected to bus bars according to well-known technologies. Bus bars are made from the same material and can be produced, for example, by printing a silver printing paste onto the heating layer, for example, using a screen printing method. Alternatively, it would also be possible to produce the bus bars from narrow metal foil strips made, for example, of copper or aluminum. These can, for example, be fixed on the adhesive layer and disposed on the heating layer at the time of the bonding of the outer and inner pane. In this process, an electrical contact can be ensured through the action of heat and pressure at the time of the bonding of the individual panes forming the windshield.

The bus bar are connected via a connection line, which is, for example, implemented as a flat-band conductor (e.g., narrow metal foil), and a power line to one terminal (for example, negative terminal) of a voltage supply device to supply a feed voltage. By means of bus bars, a heating field is enclosed, in which upon application of a feed voltage, a heating current flows. The voltage supply device can be, for example, a battery or accumulator. Preferably, the voltage supply device is different than the motor vehicle battery, or a transformer coupled to a battery.

Preferably, the voltage supply device is provided inside the vehicle with an easy access. Thus, when the non-heated windshield originally installed on the vehicle has to be replaced, it could be replaced easily by a heated windshield to provide then a vehicle equipped with a heated (coated or wired) windshield. The bus bars of the retrofitted windshield may be then easily and quickly connected to the independent voltage supply device without modification of the vehicle battery. Thus, if the windshield is not well powered, only the voltage supply device dedicated to the windshield may be replaced reducing thus the cost and the impact on the other functionalities provided on the vehicle.

The battery may be different than the vehicle battery and may for example be installed inside the vehicle for example under the passenger se Alternatively, the new retrofitted windshield may be connected directly to the vehicle battery.

Preferably, the voltage supply device is implemented such that a feed voltage between 30 to 60 volts, is made available, which can be the case, in particular with small batteries or batteries of electric vehicles.

According to the invention, the arrangement also has a temperature sensor. The at least one temperature sensor may be, disposed on the outward side of the outer pane (side 1) or preferably on the inward side of the inner pane (side 3), with it being, however, also conceivable for the at least one temperature sensor to be disposed between the two individual panes meaning laminated between the two individual panes. By means of at least one temperature sensor, the temperature of the windshield can be detected.

In another embodiment, the at least one temperature sensor may be disposed on the heating layer edge or window edge. Moreover, it is advantageous for the at least one temperature sensor to be disposed, in the window regions in which local overheating ("hot spots") can occur. These are, in particular, heating-layer-free zones, for example, communication windows or end sections of separating lines for the structuring of the heating layer.

The at least one temperature sensor can be implemented in many ways, for example, as thermocouples/thermistors.

The at least one temperature sensor, may be connected for data transfer via a data line to a microprocessor-based control device. The control device is in one embodiment further connected via a data line to a switching device associated with the voltage supply device, which switching device is connected to power lines and serves to electrically connect the voltage supply device to the heating layer. It is likewise possible for the switching device to be integrated into the voltage supply device.

The data lines can be implemented with a wired or wireless connection. Thus a de-icing and/or de-fogging process for de-icing the window 2 is, in this case, activated or started manually by operating a switching element in a control console of the motor vehicle. It would also be conceivable to start the de-icing process automatically, for example, upon starting the engine and detection of a low outside temperature below a specified threshold value, for example, 0° C. or less, by means of at least one temperature sensor. A start signal can, for example, be generated manually or automatically to activate the de-icing and/or de-fogging process.

According to the invention, the start signal may be preferably generated through an application from a smart device such as phone, an external remote control device . . . .

According to another embodiment, the start signal may be activated through a capacitive touch provided on the transparent window and particularly a windshield. This is particularly interesting when the windshield is a heated coated windshield wherein a capacitive touch function may be provided. Such as capacitive touch are described in the following patent references: WO2013189794, WO2013189796 . . . .

If a de-icing process has been activated, the temperature of the windshield is still measured before the initial application of a heating voltage to the heating layer. If the temperature of the windshield on only one temperature sensor exceeds a selectable lower temperature threshold value, here, for example, 0° C. or less, no heating voltage is applied to the heating layer and the method or de-icing/de-fogging process is terminated. For this purpose, a stop signal can, for example, be generated. The window arrangement then transitions into a standby or OFF state. If, alternatively, the temperature of the windshield equals or is less than the lower temperature threshold value, here, for example, 0° C. or less, the feed voltage comprised between 30 nand 60 volts, supplied by the voltage supply device is applied to the heating layer for a period defined by the de-icing and/or de-fogging speeds.

Then, if the temperature of the windshield measured by the at least one temperature sensor corresponds to a selectable upper temperature threshold value, here, for example, in a range from 20° C. and 90° C. or for example 70° C., the de-icing and/or de-fogging process is terminated. For this purpose, a stop signal can, for example, be generated. The window arrangement then transitions into a standby or OFF state. As already stated, preferably, a heating voltage between 30 to 60 volts, is applied to the heating layer for a till the temperature of the windshield measured by the at least one temperature sensor corresponds to a selectable upper temperature threshold value, here, for example, in a range from 20° C. and 90° C. or for example 70° C., as a result of which de-icing and/or de-fogging of the windshield can be obtained with a low electric power loss. Preferably, the heating voltage and the heating period are selected such that a heating power corresponding to a resistance less than 10 ohms ($\Omega$) per square meter ($m^2$) of window area is generated.

The invention claimed is:

1. A method to retrofit a transparent window mounted on a vehicle, which window does not comprise an electric heating device, with a transparent window having an electric heating device, the method comprising:
   a. removing from the vehicle the transparent window which does not comprise an electric heating device;
   b. installing a transparent window, provided with an electric heating device and at least one temperature sensor, to obtain a retrofitted heating transparent window;
   c. connecting the electric heating device to a voltage supply device and applying a heating voltage to the transparent window;
   d. measuring a window temperature before an initial application of a heating voltage, and terminating the method if the window temperature exceeds a lower temperature threshold value and wherein the heating voltage and a heating period are selected such that a heating power corresponding to a resistance less than 10 ohms ($\Omega$) per square meter ($m^2$) of window area is generated;
   e. applying a heating voltage between 30 and 60 volts to the heating device to apply a heating power corresponding to a resistance less than 10 ohms ($\Omega$) per square meter ($m^2$) of window area; and
   f. connecting a remote control device with the at least one temperature sensor and the voltage supply device,
   wherein the electric heating device is used for de-icing and/or defogging the retrofitted transparent window.

2. The method according to claim 1, wherein the retrofitted transparent window is electrically powered by a further voltage supply device by applying a heating voltage to the transparent window.

3. The method according to claim 2, wherein the further voltage supply device is a battery provided in a vehicle interior.

4. The method according to claim 2, wherein the further voltage supply device is provided in an interior of a vehicle.

5. The method according to claim 3, wherein the further voltage supply device is provided under the vehicle and not under a vehicle hood.

6. The method according to claim 3, wherein the further voltage supply device is independent from other voltage supply devices provided to apply a power to other powered functionalities of the vehicle.

7. The method according to claim 1, wherein the window is a laminated transparent window comprising an exterior face and an interior face.

8. The method according to claim 1, wherein a window temperature is measured by the at least one temperature sensor, the at least one temperature sensor being positioned inside the transparent window or in an interior face of the transparent window (face 4).

9. The method according to claim 1, wherein the window further comprises a switch element positioned inside the transparent window or in an interior face of the transparent window (face 4) to switch on/switch off the applying of a heating voltage to the transparent window.

10. The method according to claim 1, wherein the lower temperature threshold value is less than or equal to 4° C.

11. The method according to claim 1, wherein an upper temperature threshold value is in a range from 20° C. to 90° C.

12. The method according to claim 1, wherein the de-icing and/or de-fogging of the transparent window is monitored remotely or automatically activated when the transparent window temperature is below 0° C.

13. A window arrangement, which comprises:
   a. a transparent window with an electric heating device which is connected to at least two electrodes provided for connection to a voltage supply device such that by applying a heating voltage, a heating current flows through the electric heating device formed between the electrodes,
   b. at least one temperature sensor for measuring a window temperature, and
   c. a control device coupled with the at least one temperature sensor and the voltage supply device, which is suitably configured to carry out the method according to claim 1.

14. A window arrangement according to claim 13, wherein the retrofitted transparent window is a windshield comprising two glass sheets provided with, as the electric heating device, a heated coated film laminated between the two glass sheets and with power supplied through at least two busbars.

15. The window arrangement according to claim 14, wherein the at least one temperature sensor for measuring a window temperature is provided on an internal face of a window edge arrangement.

16. A method according to claim 1, wherein the transparent window is a vehicle windshield.

17. A method according to claim 1, wherein the electric heating device is a heating layer.

\* \* \* \* \*